United States Patent
Wieczorek

(10) Patent No.: US 10,744,946 B2
(45) Date of Patent: Aug. 18, 2020

(54) ACTUATOR DEVICE FOR A REARVIEW DEVICE OF A MOTOR VEHICLE, AND REARVIEW DEVICE FOR A MOTOR VEHICLE

(71) Applicant: SMR Patents S.à.r.l., Luxembourg (LU)

(72) Inventor: Romeo Wieczorek, Esslingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 985 days.

(21) Appl. No.: 15/104,113

(22) PCT Filed: Dec. 10, 2014

(86) PCT No.: PCT/IB2014/066767
§ 371 (c)(1),
(2) Date: Oct. 13, 2016

(87) PCT Pub. No.: WO2015/087260
PCT Pub. Date: Jun. 18, 2015

(65) Prior Publication Data
US 2017/0023111 A1    Jan. 26, 2017

(30) Foreign Application Priority Data
Dec. 13, 2013  (EP) .................................... 13197262

(51) Int. Cl.
*B60R 1/072* (2006.01)
*F03G 7/06* (2006.01)
(Continued)

(52) U.S. Cl.
CPC ............... *B60R 1/072* (2013.01); *B60R 1/00* (2013.01); *B60R 1/02* (2013.01); *B60R 1/06* (2013.01);
(Continued)

(58) Field of Classification Search
CPC .. B60K 35/00; B60R 1/00; B60R 1/02; B60R 1/06; B60R 1/062; B60R 1/07;
(Continued)

(56) References Cited

U.S. PATENT DOCUMENTS 4,665,334 A * 5/1987 Jamieson ................ F03G 7/065
310/306
5,396,769 A 3/1995 Brudnicki
(Continued)

FOREIGN PATENT DOCUMENTS

DE        69900153 T2    10/2001
DE    102010047040 A1     4/2012
(Continued)

OTHER PUBLICATIONS

PCT International Preliminary Report on Patentability, Application No. PCT/IB2014/066767, dated May 30, 2016.

*Primary Examiner* — Joseph Brown
(74) *Attorney, Agent, or Firm* — MacMillan, Sobanski & Todd, LLC

(57) ABSTRACT

The invention relates to an actuator device comprising at least one retaining means on which rearview means can be secured or is secured and which are mounted in a movable manner relative to a housing component of a rearview device and comprising at least one adjusting unit with at least one second adjusting means for moving the retaining means relative to the housing component. The first adjusting means and the second adjusting means each comprise at least one shape-memory element, and the first adjusting unit and the second adjusting unit are arranged between the housing component and the retaining means so as to be mechanically connected in series. The first adjusting unit has a first maximum travel path, and the second adjusting unit has a second maximum travel path which is different from
(Continued)

Figure 1:
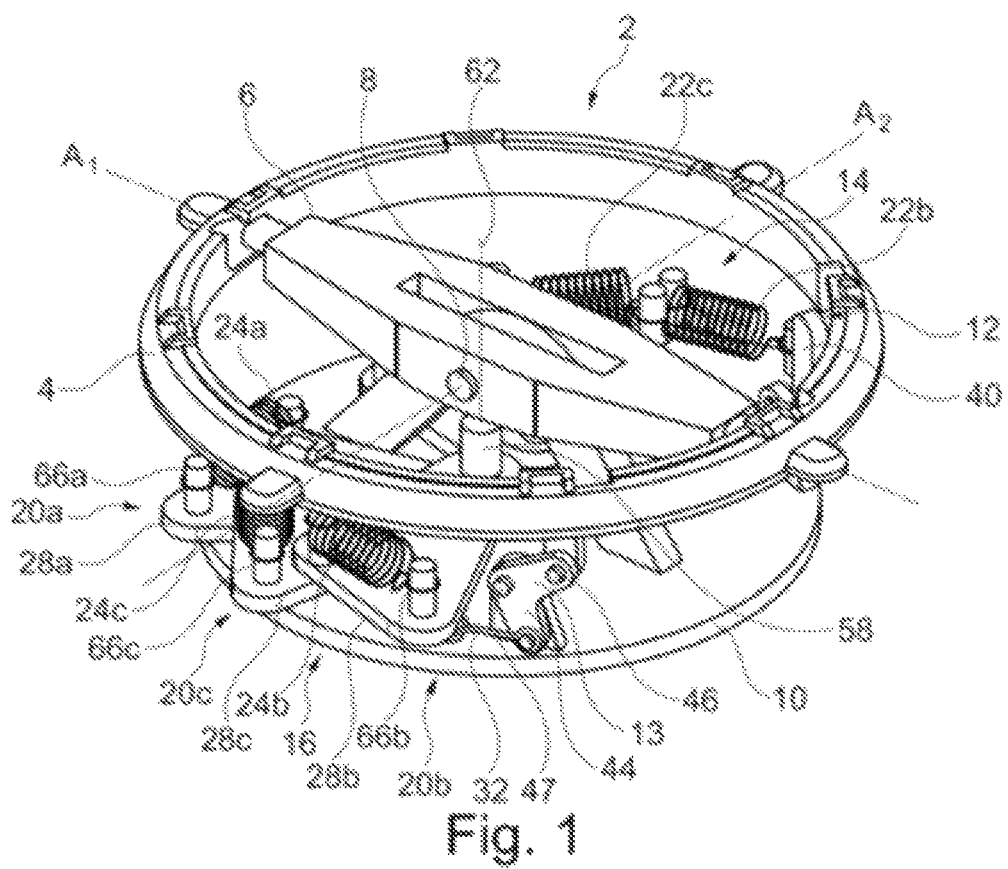

the first maximum travel path. The invention also relates to a rearview device with an actuator device according to the invention.

25 Claims, 6 Drawing Sheets

(51) Int. Cl.
| | | |
|---|---|---|
| *B60R 1/06* | (2006.01) | |
| *B60R 1/07* | (2006.01) | |
| *B60R 1/00* | (2006.01) | |
| *F16H 21/46* | (2006.01) | |
| *B60R 1/02* | (2006.01) | |
| *B60R 1/062* | (2006.01) | |
| *F16H 21/54* | (2006.01) | |
| *B60K 35/00* | (2006.01) | |

(52) U.S. Cl.
CPC ............... *B60R 1/062* (2013.01); *B60R 1/07* (2013.01); *F03G 7/065* (2013.01); *F16H 21/46* (2013.01); *F16H 21/54* (2013.01); *B60K 35/00* (2013.01); *B60R 2300/00* (2013.01); *B60R 2300/80* (2013.01); *B60R 2300/8046* (2013.01)

(58) Field of Classification Search
CPC . B60R 1/072; B60R 2300/00; B60R 2300/80; B60R 2300/8046; F03G 7/065; F16H 21/00; F16H 21/02; F16H 21/46; F16H 21/54; B25J 9/1085
USPC .................................................. 359/876, 877
See application file for complete search history.

(56) References Cited

U.S. PATENT DOCUMENTS

| | | | |
|---|---|---|---|
| 6,164,784 A | 12/2000 | Butera et al. | |
| 6,364,496 B1* | 4/2002 | Boddy | B60R 1/072 248/476 |
| 7,017,345 B2* | 3/2006 | Von Behrens | F03G 7/065 60/527 |
| 7,318,649 B2* | 1/2008 | Butera | B60R 1/072 359/849 |
| 2002/0113499 A1* | 8/2002 | von Behrens | F03G 7/065 310/306 |
| 2004/0020200 A1* | 2/2004 | Donakowski | F03G 7/065 60/527 |
| 2004/0035108 A1* | 2/2004 | Szilagyi | B23Q 1/5462 60/528 |
| 2004/0256920 A1* | 12/2004 | Gummin | F03G 7/065 310/15 |
| 2004/0261411 A1* | 12/2004 | MacGregor | F03G 7/065 60/527 |
| 2005/0000574 A1* | 1/2005 | MacGregor | B60H 1/00671 137/625.3 |
| 2009/0168198 A1 | 7/2009 | Perreault | |
| 2011/0222176 A1* | 9/2011 | Browne | B60R 1/072 359/846 |
| 2015/0130173 A1* | 5/2015 | Biller | B60R 21/04 280/736 |

FOREIGN PATENT DOCUMENTS

| | | |
|---|---|---|
| EP | 0173433 A1 | 3/1986 |
| WO | 00/25164 A1 | 5/2000 |
| WO | 01/12985 A1 | 2/2001 |
| WO | 03/093648 A1 | 11/2003 |

* cited by examiner

ACTUATOR DEVICE FOR A REARVIEW DEVICE OF A MOTOR VEHICLE, AND REARVIEW DEVICE FOR A MOTOR VEHICLE

CROSS-REFERENCE TO RELATED APPLICATIONS

This application is the National Phase of International Application PCT/IB2014/066767, filed Dec. 10, 2014 which designated the U.S. and that International Application was published under PCT Article 21(2) on Jun. 18, 2015 as International Publication Number WO 2015/087260 A1. PCT/IB2014/066767 claims priority to European Patent Application No. EP13197262.2, filed Dec. 13, 2013. The disclosures of both applications are incorporated herein by reference.

The invention relates to an actuator device for a rearview device, the actuator device comprising at least one retaining means on which rearview means can be secured or is secured and which are mounted in a movable manner relative to a housing component of the rearview device and comprising at least one adjusting device having at least one first adjusting unit with at least one first adjusting means and at least one second adjusting unit with at least one second adjusting means for moving the retaining means relative to the housing component, wherein the first adjusting means and the second adjusting means each comprise at least one shape-memory element, and the first adjusting unit and the second adjusting unit are arranged between the housing component and the retaining means so as to be mechanically connected in series. In addition, the invention relates to a rearview device for a motor vehicle with an actuator device according to the invention.

Different actuator devices for a rearview contrivance, especially a side-view mirror of a motor vehicle, are known from the state of the art. In particular, such actuator devices in which so-called shape-memory elements are used as adjusting means, are well-known.

Thus, WO 00/25164 discloses an actuator device in which four adjusting means are provided, wherein each adjusting means is assigned to an elongated body. Known adjusting means relate to shape-memory elements that can change their extent through application of current or through heating. To this end, the adjusting means embodied as shape-memory elements do not change their extent as a function of temperature or current intensity, however, but when a threshold temperature or a threshold current intensity is exceeded. They consequently implement their complete shape-shifting potential immediately. This at least renders difficult a fine adjustment of the arrangement of the rearview means.

DE69900153T2 also discloses an actuator device, which is used on a motor-vehicle rearview mirror having an anti-glare device with shape-memory structure. To achieve the anti-glare function, it is provided that a shape-memory element actuates a push rod. If a current is applied to the shape-memory element and thereby heats it, the push rod moves in such a manner that a rearview mirror is transferred into the anti-glare position. If no current is applied, a spring transfers the mirror to the non-anti-glare position. But this actuator device likewise makes possible only a "digital" change of the travel path between deflected and not deflected.

Moreover, DE102010047040A1 discloses a generic actuator device, which is used in an actuator system for generating positioning movements. To increase an adjusting range of the actuator system, it is proposed that a plurality of individual actuators be connected in series on the load-side. A disadvantage, however, is that a large number of individual actuators are needed to cover a large adjusting range.

Finally, U.S. Pat. No. 5,396,769 discloses another generic actuator device in the form of a rotation actuator. It is likewise proposed that a plurality of single adjusting elements be functionally connected in series to provide an increased adjusting range. But this actuator too has the disadvantage that a large number of single adjusting units is needed to achieve a comparatively large travel path.

It is therefore the object of the invention to further develop the generic actuator devices known from the state of the art in such a manner so as to overcome the disadvantages of the state of the art, to provide in particular an actuator device for a rearview device and a rearview device for a motor vehicle having such an actuator device in which the adjustability of the arrangement of the rearview means is improved, especially to make possible a large travel path with a reduced number of adjusting means.

This object is achieved by an actuator device as mentioned above according to the invention in that the first adjusting unit has a first maximum travel path and the second adjusting unit has a second maximum travel path which is different from the first maximum travel path.

To this end, an actuator device according to the invention can be characterized by at least one steering body, a first end of which is or can be mechanically connected to the retaining means and a second end of which is or can be mechanically connected to the adjusting device, especially the second adjusting unit and/or the second adjusting means, in order to transmit at least one adjusting movement of the adjusting device, especially of the first adjusting unit, preferably of the first adjusting means, and/or of the second adjusting unit, preferably of the second adjusting means, to the retaining means.

Moreover, an actuator device can at least have a first adjusting body by means of which the first adjusting unit, especially the first adjusting means, and the second adjusting unit, especially the second adjusting means, are at least indirectly mechanically connected to one another and/or wherein the first adjusting unit, especially the first adjusting means, is mechanically arranged between the housing component and the first adjusting body.

Moreover, an actuator device according to the invention can be characterized by at least one second adjusting body, wherein at least one steering body and/or the retaining means is and/or are in mechanical connection with the second adjusting body, and/or the second adjusting means is mechanically arranged between the first adjusting body and the second adjusting body.

With the invention, it is also proposed that the adjusting device comprise at least one third adjusting unit having at least one third adjusting means comprising at least one shape-memory element, wherein the third adjusting unit can be or is mechanically arranged between the first adjusting unit and the second adjusting unit.

In the aforementioned embodiment, it is especially preferred that a plurality of third adjusting units is present and at least one first third adjusting unit is mechanically arranged between the first adjusting unit and at least one second third adjusting unit, wherein the second third adjusting unit is again mechanically arranged between the first third adjusting unit and the second adjusting unit.

With the invention, it is also proposed for the above two embodiments that the third adjusting unit have a third maximum travel path different from the first maximum travel path and the second maximum travel path, especially a first third maximum travel path of the first third adjusting unit which is different to a second third maximum travel path of the second third adjusting unit.

Moreover, an actuator device configured in this manner can also be characterized by at least one third adjusting body, which mechanically connects the third adjusting unit, especially the third adjusting means, and the second adjusting unit, especially the second adjusting means, to each other, preferably directly, wherein especially the first adjusting body connects the first adjusting unit, preferably the first adjusting means, and the third adjusting unit, preferably the third adjusting means, to one another, especially directly, and/or a plurality of third adjusting bodies are present, wherein at least one of the third adjusting bodies mechanically connects at least two third adjusting units, preferably two third adjusting means, to one another, especially directly.

It is particularly preferred that at least one first mechanical limit stop limit the mobility of the first adjusting body relative to the housing component, at least one second mechanical limit stop limit the mobility of the second adjusting body and/or of the steering body relative to the first adjusting body and/or to the third adjusting body, at least one third mechanical limit stop limit the mobility of the third adjusting body relative to the first adjusting body and/or the mobility of a first third adjusting body relative to at least one second third adjusting body, especially that the first mechanical limit stop delimit the first maximum travel path, the second mechanical limit stop delimit the second maximum travel path and/or the third mechanical limit stop delimit the third maximum travel path, especially that at least one first third mechanical limit stop delimit the first third maximum travel path and/or a second third mechanical limit stop delimit the second third maximum travel path.

Moreover, the invention proposes that the maximum first, second and/or third travel paths differ in such a manner that at least two maximum travel paths differ by a factor of 2, preferably that all maximum travel paths differ from one another so that one maximum travel path is twice as large as another maximum travel path.

An actuator device according to the invention can also be characterized in that the first mechanical limit stop comprises at least one first limit-stop element, which is arranged stationary to the housing component and interacts with at least one complementary first structure of the first adjusting body, the second mechanical limit stop comprises at least one second limit-stop element, which is arranged stationary to the first adjusting body and/or to the third adjusting body and interacts with at least one complementary second structure of the second adjusting body and/or of the steering body, the third mechanical limit stop comprises at least one third limit-stop element, which is arranged stationary to the first adjusting body and interacts with at least one complementary third structure of the third adjusting body, the first third mechanical limit stop comprises at least one first third limit-stop element, which is arranged stationary to the first adjusting body and interacts with at least one complementary first third structure of the first third adjusting body, and/or the second third mechanical limit stop comprises at least one second third limit-stop element, which is arranged stationary to the first third adjusting body and interacts with at least one complementary second third structure of the second third adjusting body.

In this embodiment, it is particularly preferred that the first limit-stop element, the second limit-stop element, the third limit-stop element, the first third limit-stop element and/or the second first limit-stop element comprises or comprise at least one rising, at least one pin and/or at least one tappet, and/or that the first structure, the second structure, the first structure, the third structure, the first third structure and/or the second third structure comprises or comprise at least one surface, at least one opening, at least one elongated hole and/or at least one groove, or that the first limit-stop element, the second limit-stop element, the third limit-stop element, the first third limit-stop element and/or the second first limit-stop element comprises and/or comprise at least one surface, at least one opening, at least one elongated hole and/or at least one groove, and/or that the first structure, the second structure, the third structure, the first third structure and/or the second third structure comprises or comprise at least one rising, at least one pin and/or at least one tappet.

The invention furthermore proposes for the aforementioned embodiments, that the first limit-stop element, the second limit-stop element, the third limit-stop element, the first third limit-stop element, the second first limit-stop element, the first structure, the second structure, the third structure, the first third structure and/or the second third structure acts like a guide element or act like guide elements, especially for guiding the movement of the first adjusting unit, the second adjusting unit, the third adjusting unit, the first adjusting body, the second adjusting body, the third adjusting body and/or the steering body.

It is also proposed with the invention that the first adjusting body, the second adjusting body, the third adjusting body, the first third adjusting body and/or the second third adjusting body is or are embodied on an area-wide basis, and/or that at least two adjusting bodies are rotatably mounted around a common bearing axis, which is preferably secured by at least one bearing element.

It is particularly preferred that the actuator device can be used to move a rearview device of a motor vehicle.

An actuator device according to the invention can also be characterized in that the retaining means is embodied plate-like or frame-like, that the rearview means is embodied on an area-wide basis and comprises at least one mirror, at least one camera and/or at least one display device, like a display, and/or can be moved in a translatable, rotatable and/or slewable manner relative to the housing component and/or from at least one first position into at least one second position relative to the housing component by means of the actuator device.

It is further proposed with the invention that the first adjusting unit comprises at least two first adjusting means, the second adjusting unit comprises at least two second adjusting means and/or the third adjusting unit comprises at least two third adjusting means, wherein the two first adjusting means can change the first travel path into different, especially opposite directions, the two second adjusting means can change the second travel path into different, especially opposite directions and/or the third second adjusting means can change the third travel path into different, especially opposite directions.

A preferred embodiment can also be characterized in that, when heated or energized, the shape-memory elements change their extent into at least one principal direction of extension, especially into a direction of extension running parallel to the travel path of the respective adjusting unit, wherein the degree of change of the extent depends on and is preferably proportional to a current intensity of the applied current and/or a temperature of the heating.

It is particularly preferred that a working direction of the first adjusting unit, the second adjusting unit and/or the adjusting unit, especially of the first adjusting means, the second adjusting means and/or the third adjusting means runs essentially parallel, perpendicularly or diagonally to at least one principal plane of the retaining element and/or rearview means.

The invention furthermore proposes that at least two adjusting means, preferably all adjusting means, can be or are triggered in common or independently of one another, especially by application of current and/or heat.

A particularly preferred embodiment is characterized by at least one bearing unit, especially a bearing unit extended tappet-like, wherein the first end of the bearing unit can be or is secured on the housing component and the retaining means can be or is mounted, especially essentially concentrically mounted, on the free end of the bearing unit opposite the first end in such a manner that the retaining means can be moved by the actuator device.

The aforementioned embodiment can further be characterized by at least two adjusting devices, wherein at least one first adjusting device can preferably rotate and/or swivel the retaining means around at least one first axis and at least one second adjusting device can rotate and/or swivel the retaining means around at least one second axis, which preferably runs orthogonal to the first axis, the first adjusting device can simultaneously rotate and/or swivel the retaining means around the first axis and the second axis, and the second adjusting device can simultaneously rotate and/or swivel the retaining means around the first axis and the second axis, wherein a first movement of the first adjusting device that is preferably in the same direction and/or mirror-symmetric in relation to a second movement of the second adjusting device leads to a rotation/swivel around the first axis and/or the second axis in a direction counter to that of the second movement, at least one first adjusting device can move the retaining means
in at least one first direction and at least one second adjusting device can move the retaining means in at least one second direction, especially a second direction orthogonal to the first direction, the adjusting devices are arranged on the retaining means essentially mirror-symmetric to a mirror axis running perpendicular to the longitudinal direction of extension of the bearing unit and/or the adjusting devices are arranged essentially mirror-symmetric to a direction running perpendicular to the longitudinal direction of extension of the bearing unit.

With the invention, it is moreover proposed that at least one steering body comprise two steering legs, especially steering legs arranged L-shaped to one another, that a securing element of the adjusting device and/or an adjusting body of the adjusting device can be secured or is secured on at least one first steering leg, that the second steering leg can be secured on the retaining means, and/or that the first steering leg and the second steering leg can be or are rotatably arranged on a common steering-leg axis.

Finally, it is proposed for the actuator device that the at least one steering body comprises a plastic, a ceramic and/or a metal.

Furthermore, the invention provides a rearview device for a motor vehicle comprising at least one housing component and a retaining means for at least one rearview means, wherein at least one actuator device can move the retaining means and preferably rotate and/or swivel the retaining means relative to the housing component in at least one spatial direction, preferably two and/or three spatial directions, wherein at least one actuator device according to the invention can be or is used as actuator device.

The invention is thus based on the surprising realization that the actuator device can be configured in a particularly compact manner although a comparatively large travel path is possible and that the travel path can be varied in relatively small steps at the same time, thus making possible a good fine control in that the maximum travel paths of individual adjusting units are embodied different in size. As already known from the state of the art, it is thereby possible to trigger the position of the steering means at least two-level by arranging at least two adjusting units or their adjusting means essentially in mechanical series, thus "one behind the other", with respect to their principal direction of extension and assigning them to the same steering means. The different travel paths of the adjusting units furthermore make it possible to already realize four different travel paths with two adjusting units. If the first adjusting unit is activated, a movement having a first travel path will take place. Alternatively, if the second adjusting unit is activated while the first adjusting unit is not activated, there follows a movement by a second travel path.

In contrast to the actuator device known from the state of the art, these travel paths are nevertheless different in size, so that two different movements can already be executed. In the actuator devices known from the state of the art, this alternative actuation leads only to the same travel path. If the first and the second adjusting devices are actuated, one travel path, which results from the sum of the first and the second travel paths, is realized. Thus by using two adjusting units, the actuator device according to the invention already makes it possible to realize a three-level movement. "Three-level" is hence understood to mean that if one of the two adjusting units is actuated, namely that adjusting means is energized or heated through which there alternatively result different travel paths, especially different movements of a steering body, in order the change of the extension of the heated or the energized adjusting means. If two adjusting units are actuated, especially if adjusting means are energized or heated, then a maximum travel path, in particular a maximum deflection of the steering body, that results from the sum of the single maximum travel paths of the two adjusting units, is achieved.

This improves an alignment or adjustment of the rearview means, particularly the precision, and simplifies the construction of the actuator.

Moreover, the adjustability of the rearview means is expanded. Thus for n adjusting means which are mechanically "connected in series", there result $2^n$ stable adjustment positions. If the maximum path of the adjusting means is limited so that the $(n+1)^{th}$ adjusting means has twice the travel path of the $n^{th}$ adjusting means, then the mobility of the retaining means will have a fine resolution of the first adjusting element.

A "cascade" which represents a binary system is thus realized, wherein there result $2^n$ positions from n adjusting units. If for example one takes an actuator device having three adjusting units as a basis, and if the first adjusting unit makes possible a maximum travel path of the distance x, for example 1 mm, the second adjusting unit a maximum travel path of 2x,
for example 2 mm, and the third adjusting unit a maximum travel path of $2^{2x}$, thus 4x, for example 4 mm, there results a total of 8 stable positions, namely travel path 0 mm to 7 mm, each in a 1 mm interval.

If for example a travel path of 3 mm is to be realized, the first and second adjusting units are actuated, to achieve a travel path of 4 mm only the third adjusting unit, and to realize a travel path of 6 mm the second and third adjusting unit. If beyond that four adjusting units are used, there already result 16 stable positions whereas for five adjusting units there are already 32 stable positions.

A relatively detailed adjustment possibility having a small grid but a comparatively large, resulting maximum travel path is thus provided. Like in a bar code, the individual adjustment paths arise in relation to the value of the dual system.

To permit a rapid change of the travel path in the single steps, it is particularly preferred that each adjusting unit comprise at least two adjusting means, which make possible a change of the travel path of the respective adjusting unit in different directions. If in the preceding example there should be an adjustment from 1 mm to 2 mm for example, then upon deactivation of the first adjusting unit, another adjusting means in the first adjusting unit is firstly actuated so that the travel path of the first adjusting unit is reset to 0 mm and the particular adjusting means of the second adjusting unit that leads to a setting of the maximum travel path of 2 mm in the second adjusting unit is actuated at the same time. If on the other hand the travel path is to be increased from 2 to 3 mm, only the particular adjusting means in the first adjusting unit that enables the movement of the first adjusting unit to a maximum travel path of 1 mm is to be actuated. To achieve a travel path from 0 to 7 mm, however, then all three adjusting means of the three adjusting units are simultaneously triggered in common to achieve this maximum travel path. It is therefore advantageous if the at least two adjusting units, in particular their adjusting means, can be or are triggered in common or independently of each other, particularly if they can be energized or heated.

The triggering preferably occurs via a control unit which has a counter from 0 to $2^n+1$, with n equal to the number of adjusting units. The respective adjusting unit is triggered according to the state of the counter, for counter 1 the first adjusting unit is triggered, for counter 2 the second adjusting unit is triggered and the first adjusting unit is reset, for counter 3 the first and second adjusting unit are triggered, for counter 4 the third adjusting unit is triggered and the first and second adjusting unit are reset, etc. This allows the retaining means to slowly transfer into the desired position in a gentle motion similarly as in the known motor drive, for example in that the counter slowly counts down from the starting value 7 to the setpoint 3.

The rearview means can comprise a mirror or a display device, like a display. Images, recorded by sensors or cameras for example, can be presented on the display. The rearview means can also comprise the camera, wherein the images are displayed on a separate display device.

The arrangement of the at least two adjusting units is basically discretionary. It has proven advantageous, however, for the working direction of at least two adjusting units arranged behind one another to run essentially parallel, perpendicular or diagonally to the plane of the retaining means.

If the at least two adjusting units arranged one behind the other run essentially parallel to the plane of the retaining means, then the actuator device and the rearview device can be configured compactly, in particular flat relative to the plane of the retaining means, preferably fanned-out. If the at least two adjusting units run behind one another essentially perpendicularly to the plane of the retaining means, the housing component must allow for adequate installation space perpendicular to the plane of the retaining means.

To permit a change of the alignment of the retaining means, one embodiment of the actuator device provides for at least one bearing unit, especially a bearing unit extended tappet-like, wherein one end of the bearing unit can be or is secured on the housing component and the plate-like or frame-like retaining means can be or is mounted, especially essentially concentrically mounted, on the free end of the bearing unit.

The retaining means can be secured rotatably, especially tiltable, around the tappet-like extended bearing unit. It is basically conceivable that tilting movements by 360° are possible, especially if the retaining means is secured essentially concentric to the tappet-like extended bearing unit. In addition, it is conceivable that the retaining means is secured eccentric to the bearing unit. In both cases, it has proven advantageous to provide a cross strut running essentially through the center of gravity of the bearing unit to also enable a movement around this axis. Bearing by means of a ball bearing, ball-and-socket joint, or ball element is also possible.

If the actuator device comprises adjusting bodies that connect the individual adjusting units to one another, it is possible to realize the delimitation of the travel path of each adjusting unit to the respective maximum travel path in a simple manner. Thus limit stops which achieve the delimitation of the travel path can be provided between the respective adjusting bodies. Thus each respective adjusting body can have an elongated hole which is engaged by a respective tappet of another adjusting body or of the housing component. This configuration achieves a guiding of the adjusting body or its movement and simultaneously limits the mobility. The guide function furthermore increases the stability of the actuator device and thus ensures operational safety. The limit stops can furthermore ensure that the shape-memory elements or adjusting means are operated in a prescribed range. This can achieve a long durability and unvarying adjusting precision.

The actuator device thus preferably comprises at least one adjusting body, which can be moved from an unconfirmed initial state into a working position, as well as at least one guide element for guiding the movement from the initial sate into the working position, at least one adjusting means recess for securing at least one adjusting means and at least one coupling element for coupling the adjusting body to the housing component or to another adjusting body, especially in a manner with limited mobility.

The adjusting bodies can guide the adjusting movements of the at least two adjusting means, thereby increasing the stability of the actuator device.

Adjusting body and mechanical limit stop can basically be configured as desired provided that they fulfill the task of guiding an adjusting movement of the adjusting body and/or providing delimitation in at least one final position. It is particularly easy and inexpensive to produce the adjusting body and mechanical limit stop if the pairs of adjusting bodies comprise a cam and a complementary elongated-hole section.

One embodiment of the actuator device provides for a plurality of adjusting bodies which can be moved around a bearing unit fan-like. This group of adjusting bodies having adjusting units arranged fan-like form an adjustment package or an adjusting device, wherein at least one first adjusting body having its structure embodied as elongated hole can be or is arranged on a limit-stop element of the housing component and wherein a first adjusting unit, especially the first adjusting means, extends between the limit-stop element of the housing component and an adjusting means recess of the first adjusting body and/or at least one second adjusting body having its structure embodied as elongated hole can be or is arranged on a limit-stop element of the first adjusting body and wherein a second adjusting unit, especially the second adjusting means, extends between the limit-stop element of the first adjusting body and an adjusting means recess of the second adjusting body. One or a plurality of third adjusting bodies can moreover be arranged between first and second adjusting unit.

Complementarily or as an alternative, it is possible to provide a securing element which can be or is arranged between the second adjusting body and the steering body.

To further improve the adjustability of the actuator device, and to enable a three-dimensional movement in particular, one embodiment of the actuator device provides for at least two adjusting devices, which are arranged on the retaining means essentially mirror-symmetric to a mirror axis running perpendicular to the longitudinal direction of extension of the bearing unit, as well as at least two adjusting devices, which are arranged essentially mirror-symmetric to a longitudinal direction of extension of the bearing unit. This allows the retaining means to move, especially to rotate or tilt, around two axes running orthogonal to one another and thus makes possible an alignment of the retaining means in nearly every spatial direction.

The adjusting means can basically be configured as desired. It is particularly easy and inexpensive to realize if the at least one adjusting means comprises at least one shape-memory spring. Shape-memory elements (FGE) within the meaning of the invention are understood to mean elements which can "reverse-deform themselves back" into their original shape after a deformation. This reverse-deformation is triggered in particular by heating the element, for example by applying current, thus the transmission of a direct or alternating current and the thereby resulting heating on the basis of ohmic resistance. To this end, the shape-memory element at least partially comprises a shape memory alloy (SMA). Suitable shape-memory elements are embodied in certain areas as coil springs for example. They can have a diameter of 6 mm and move a load of 7-10N, approximately 8N for example. To this end, the coil spring wire can have a diameter of 1 mm and 10 windings can be provided. The shape-memory element can have two stable states depending on temperature, a first for temperatures smaller than 70° C., for example with a spring of length 25 mm, and a second for temperatures larger than 110° C., for example with a spring of length 15 mm. Thus a travel length of 10 mm at a constant load of 8N will result. The length of the non-springy areas of the shape-memory element can be approximately 10 mm so that a compact construction results.

It has furthermore proven advantageous if at least one steering body comprises two steering legs, especially steering legs arranged L-shaped to one another, if the second adjusting unit engages at least one first steering leg and if the second steering leg can be secured on the retaining means, and/or if the first steering leg and the second steering leg can or are arranged rotatable on a common steering-leg axis.

Finally, the at least one steering body can comprise a plastic, a ceramic and/or a metal.

The provision of at least one steering body, especially of at least three steering bodies, makes it possible to guide and delimit the adjusting movements when the adjusting means are triggered. This increases the stability of the actuator device.

The actuator device according to invention and the rearview device according to invention thus prove themselves advantageous in multiple respects.

Thus the actuator device is noiseless, lighter, flatter in comparison to conventionally used motor drives and exhibits no electromagnetic compliance (EMC) problems.

Further features, details and advantages of the invention arise from the enclosed claims, the graphic representation and the following description of preferred embodiments of the invention.

Figure 2A:
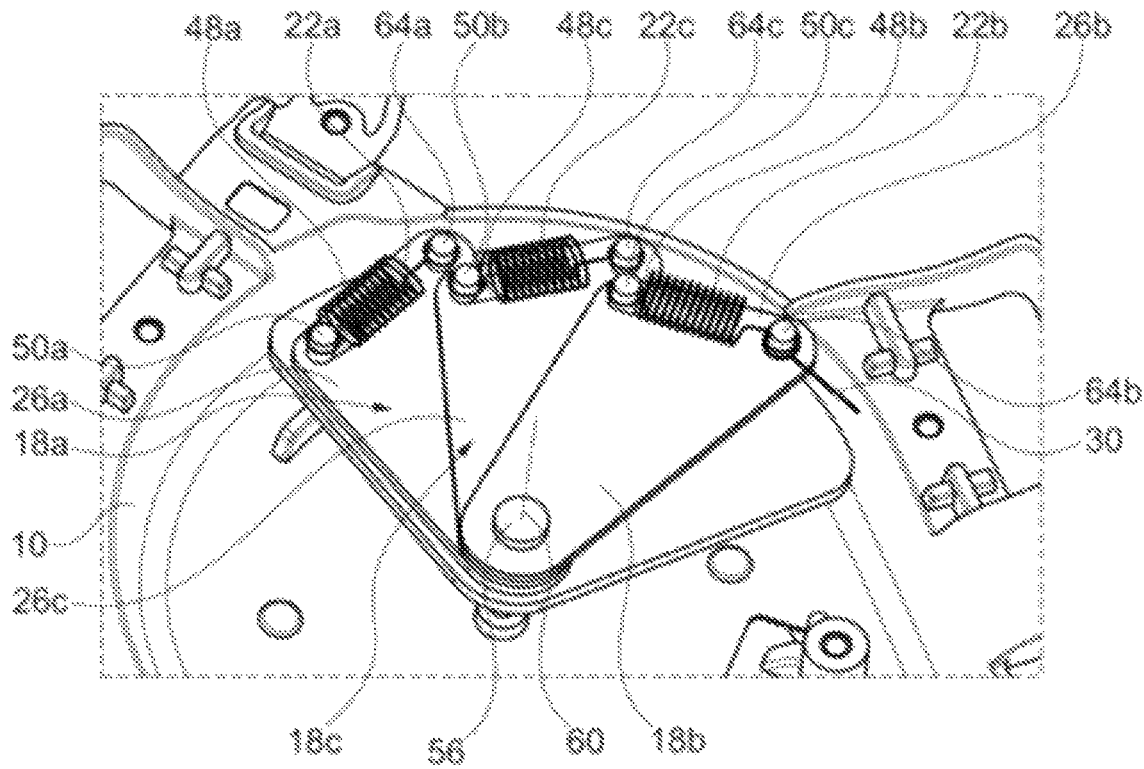

The drawing shows:

FIG. 1 a perspective side view of an actuator device;

FIG. 2A a top view onto an adjusting device of the actuator device according to FIG. 1.

Figure 2B:
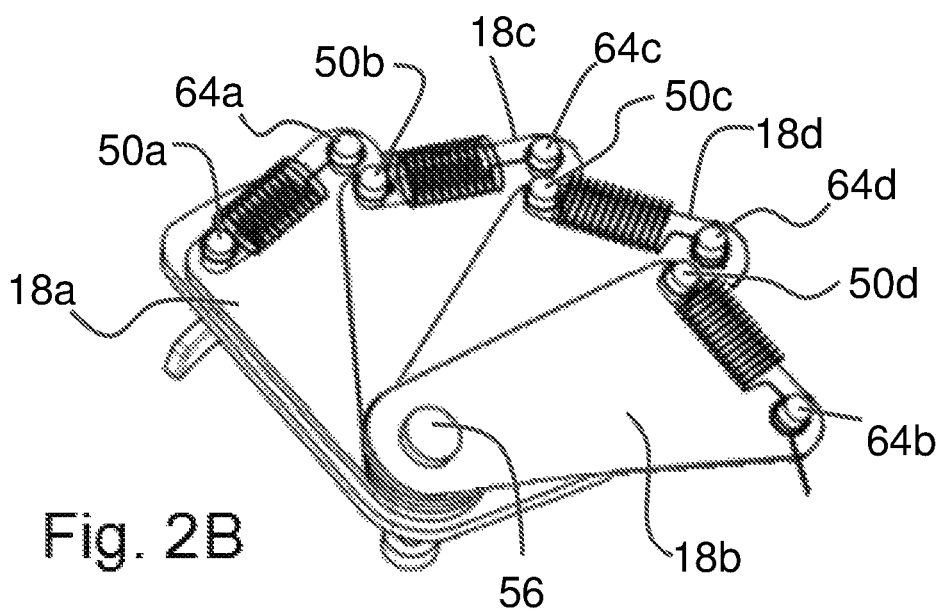

FIG. 2B a top view of an adjusting device similar to FIG. 1 having a plurality of third adjusting units.

Figure 3:
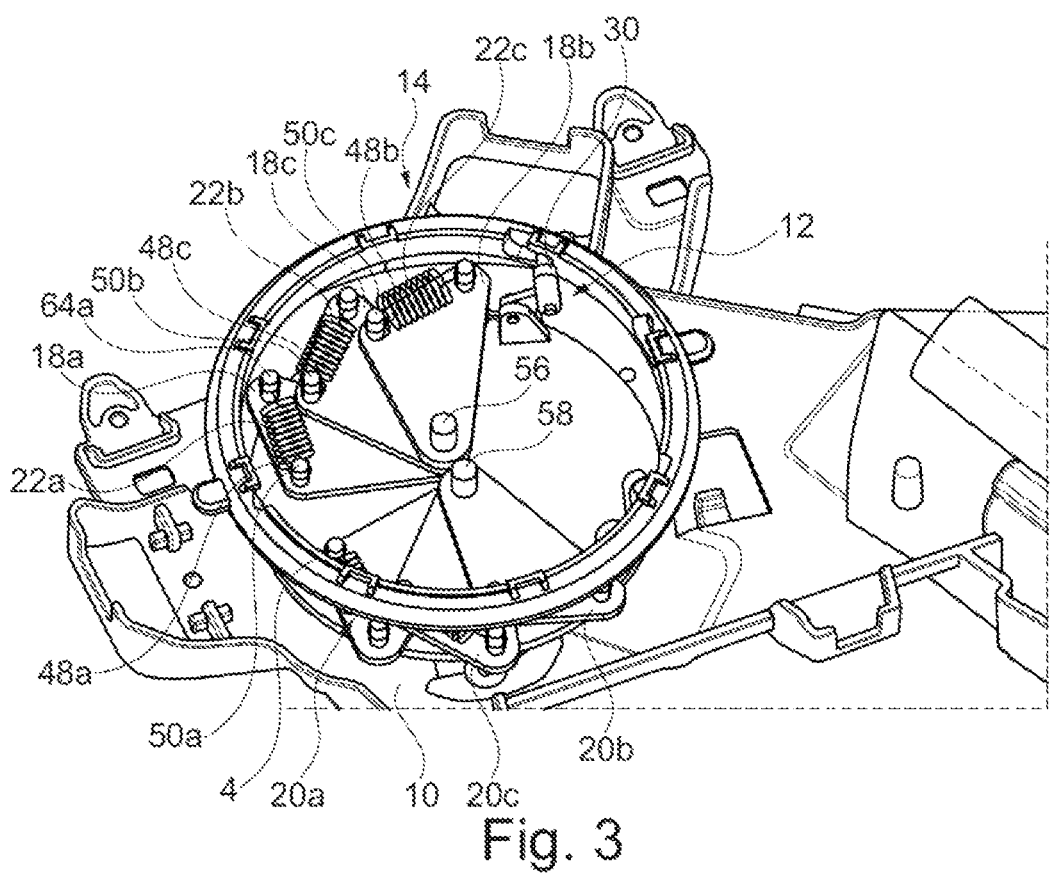
Figure 4:
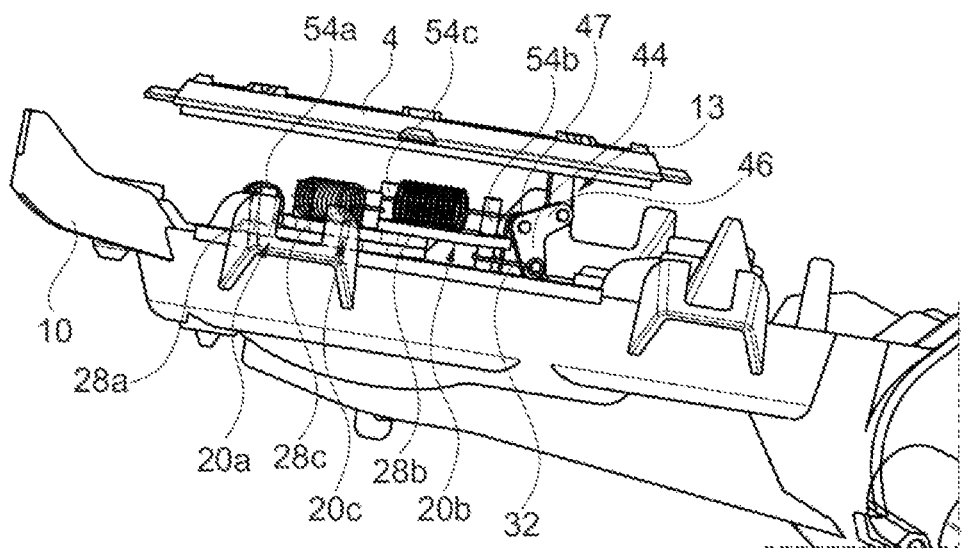
Figure 5:
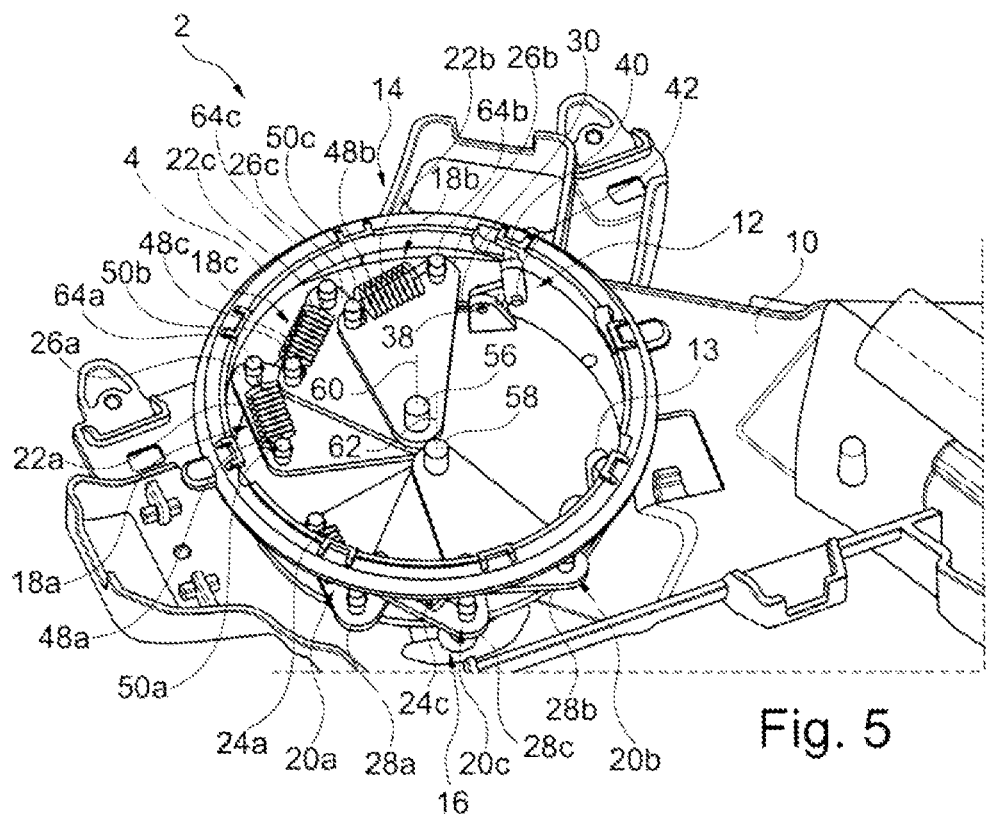
Figure 6:
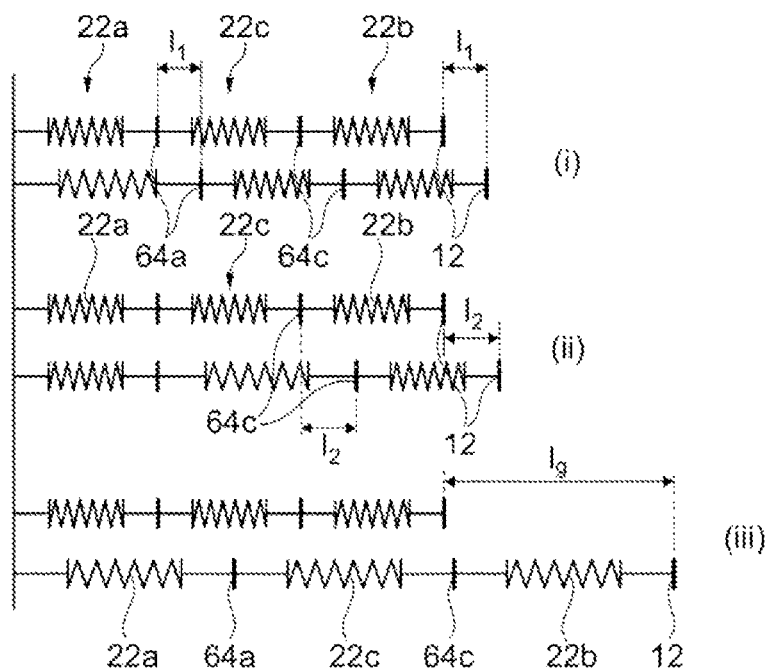
Figure 7:
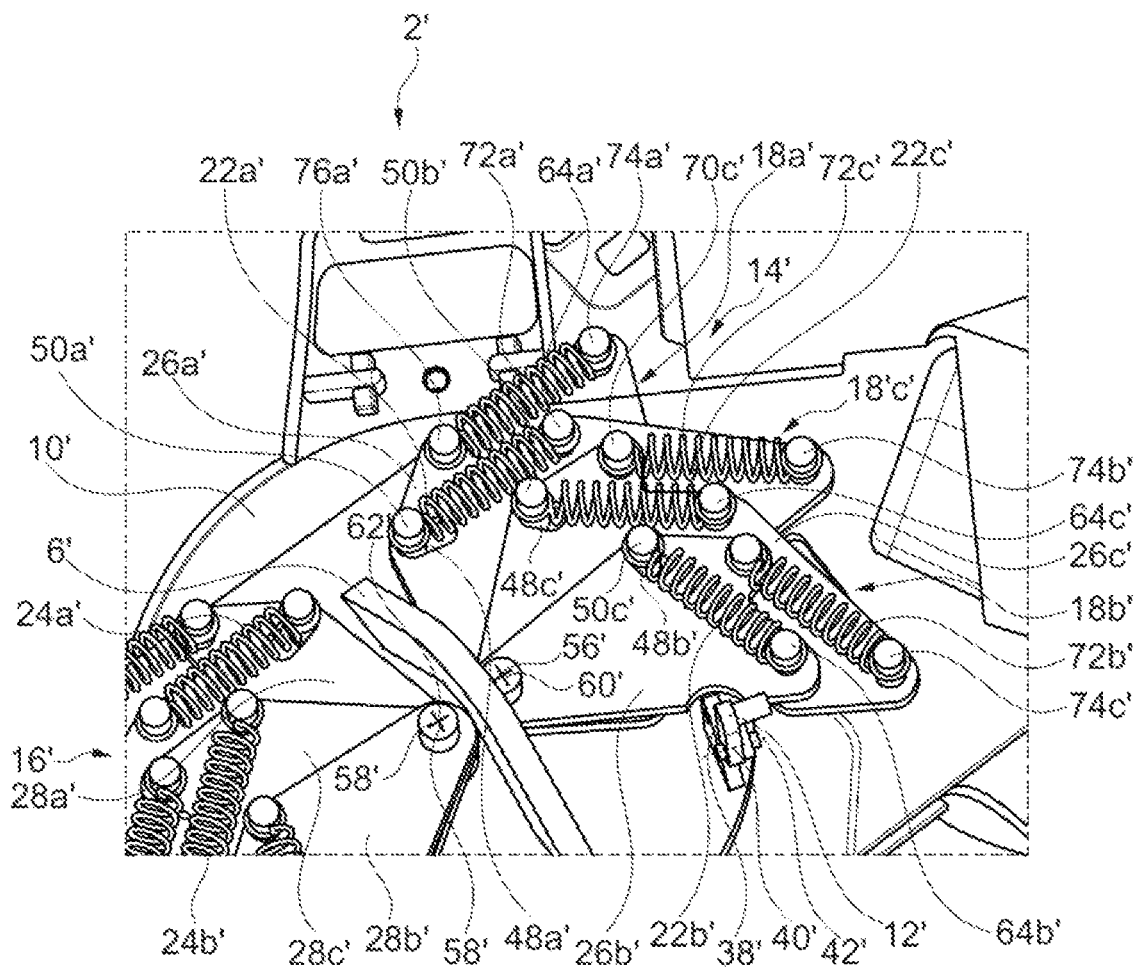
Figure 8:
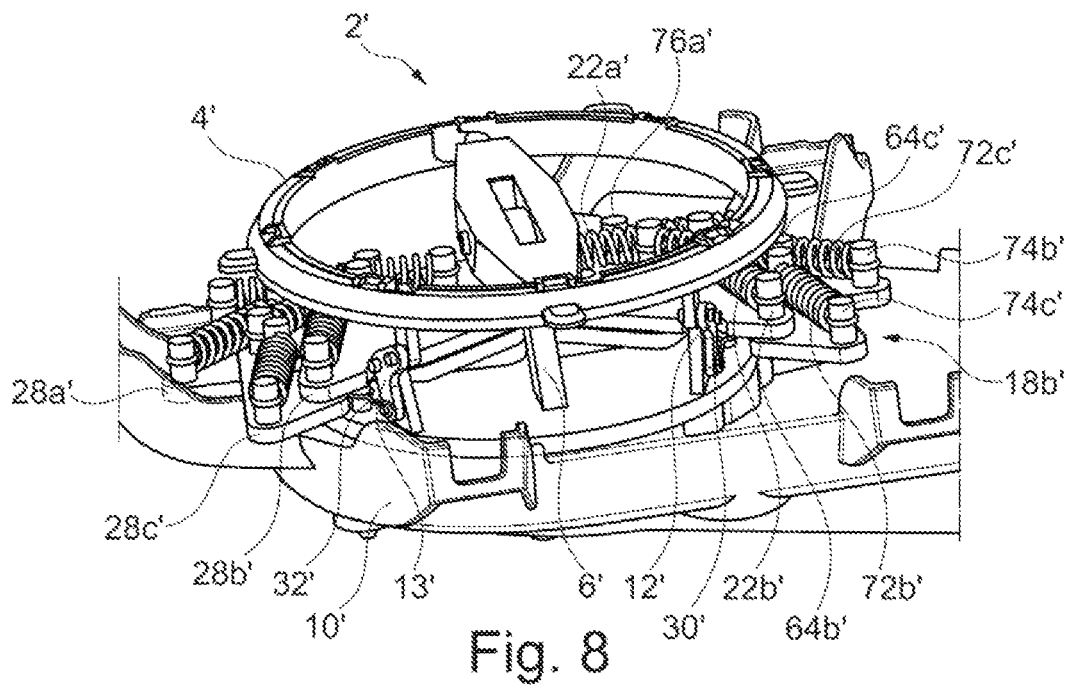

FIG. 3 a top view on the actuator device according to FIGS. 1 and 2 without bearing unit;

FIG. 4 a side view of the view according to FIG. 3;

FIG. 5 another perspective view on the actuator device according to the first embodiment;

FIG. 6 a schematic representation of three exemplary travel paths of the adjusting units of an adjusting device of the actuator device of FIGS. 1 to 5;

FIG. 7 a perspective view on an actuator device according to the second embodiment;

FIG. 8 a second perspective view on the actuator device of FIG. 7; and

Figure 9:
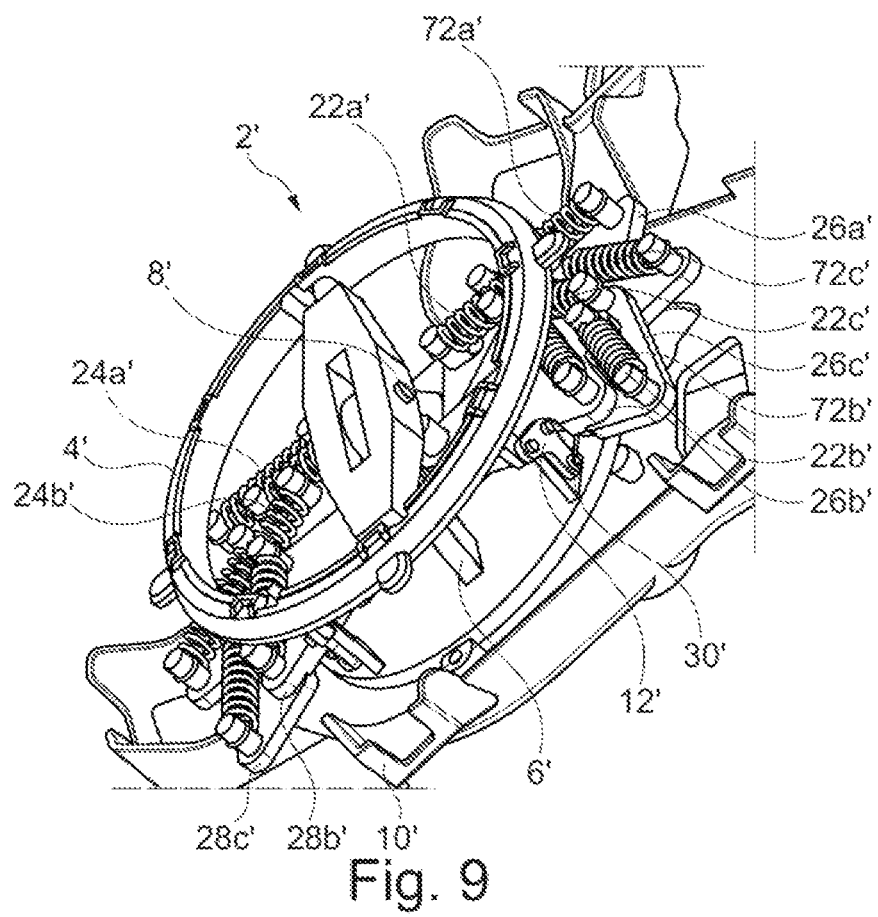

FIG. 9 a third perspective view on the actuator device of FIGS. 7 and 8.

The FIGS. 1 to 5 depict an actuator device for a rearview device of a motor vehicle according to a first embodiment denoted as a whole by the reference character 2. It comprises a frame-like retaining means 4, which is embodied annular in the embodiment example illustrated in the figures. A rearview mirror on an area-wide basis, like a mirror, a display or alternatively a camera can be secured (not illustrated in the figures) on the retaining means 4. The retaining means 4 is arranged rotatable around a first axis $A_1$ on a bearing unit 6, which is tappet-like in particular. The bearing unit 6 is again mounted on a cross strut 8 so that it can rotate around a second axis $A_2$. The cross strut 8 is arranged stationary to a housing component 10 of the rearview device.

The actuator device 2 can transfer, especially rotate, the retaining means 4 around each of the axes $A_1$, $A_2$ into eight different positions relative to the housing component 10. To this end, the retaining means 4 is in active engagement with steering bodies 12, 13, which can transfer an adjusting movement [from] two adjusting devices 14, 16 to the retaining means 4.

In the embodiment example illustrated in the FIGS. 1 to 5, each adjusting device 14, 16 comprises three adjusting units 18*a*, 18*b*, 18*c* or 20*a*, 20*b*, 20*c* respectively. Each adjusting unit 18*a*, 18*b*, 18*c* or 20*a*, 20*b*, 20*c* comprises at least one adjusting means, wherein the adjusting means comprise shape-memory elements 22*a*, 22*b*, 22*c* or 24*a*, 24*b*, 24*c* respectively. In this example, the shape-memory elements 22*a*, 22*b*, 22*c* or 24*a*, 24*b*, 24*c* are embodied as spiral spring elements, but can basically assume any suitable form. In addition, the adjusting devices 14, 16 each comprise three adjusting bodies 26*a*, 26*b*, 26*c* or 28*a*, 28*b*, 28*c* respectively.

As particularly evident in FIG. 2A, the adjusting device 14 comprises a first adjusting unit 18*a*, a second adjusting unit 18*b* and a third adjusting unit 18*c* mechanically arranged between the first adjusting unit 18*a* and second adjusting unit 18*b*. To this end, a first adjusting means, which comprises the shape-memory element 22*a*, is mechanically arranged between the housing component 10 and a first adjusting body 26. The second adjusting means, which comprises the shape-memory element 22b, is mechanically arranged between the second adjusting body 26b and the third adjusting body 26c. Finally, the third adjusting means, which comprises the shape-memory element 22c, is mechanically arranged between the first adjusting body 26a and the second adjusting body 26b.

Altogether, the result is that the adjusting units are mechanically arranged in the sequence 18a-18c-18b, the shape-memory elements are mechanically arranged in the sequence 22a-22c-22b and the adjusting bodies are mechanically arranged in the sequence 26a-26c-26b. In particular, the adjusting means or the shape-memory elements 22a, 22b, 22c are essentially mechanically connected one behind the other in series in relation to their working direction and indirectly secured to each other by the adjusting bodies 26a, 26b, 26c.

FIG. 1 depicts the actuator device 2 in a side perspective view. It can be seen that the two adjusting devices 14, 16 are arranged on the housing component 10. To this end, the second adjusting device 16 is constructed essentially analogously, but mirror-symmetric, to the first adjusting device 14.

The second adjusting device 16 thus comprises the first adjusting unit 20a, the second adjusting unit 20b and the third adjusting unit 20c, which are mechanically connected in series in the sequence 20a-20c-20b.

To this end, a first adjusting means comprising the first shape-memory element 24a is mechanically arranged between the housing component 10 and a first adjusting body 28a, a third adjusting means comprising the third shape-memory element 24c is mechanically arranged between the first adjusting body 28a and the third adjusting body 28c and a second adjusting means, which comprises the shape-memory element 24b, is mechanically arranged between the third adjusting body 28c and the second adjusting body 28b. Two securing elements 30, 32 respectively mechanically connect the two adjusting bodies 26b and 28b to the steering bodies 12, 13. The securing elements 30, 32 are embodied as longitudinally movable levers or rods for example. Analogously to the adjusting devices 14, 16, the adjusting bodies 12, 13 and securing elements 30, 32 are also arranged mirror-symmetric to the axis $A_1$ and are thus on different sides along the axis $A_2$ if axis $A_1$ determines the zero point of $A_2$.

As is furthermore evident in FIG. 5, the steering bodies 12, 13 are arranged on the retaining means 4 in such a manner that the retaining means 4 can tilt or rotate around the axis $A_2$ by means the cross strut 8 as well as around the axis $A_1$ by means of bearing unit 6 when a movement of the actuator elements 30, 32 is transmitted to the steering bodies 12, 13. To this end the securing elements 30, 32 transmit a movement of the two adjusting bodies 26b, 28b to the steering bodies 12, 13.

To transmit the adjusting movement of the adjusting devices 14, 16 to the steering bodies 12, 13, the securing element 30 connects the second adjusting body 26b of the second adjusting unit 18b of the adjusting device 14 to the steering body 12, the second adjusting body 26b being located nearest to the steering body 12. Analogously, a securing element 32 connects the steering body 13 to the second adjusting body 28b of the second adjusting unit 20b of the adjusting device 16.

The securing element 30 connects the second adjusting body 26b to a first steering leg 38 of the steering body 12. The steering body 12 furthermore demonstrates a second steering leg 40, which is secured on the retaining means 4. The first steering leg 38 and the second steering leg 40 of the steering body 30 are rotatably mounted around a common steering-leg axis 42 and arranged L-shaped. In an analogous manner, the steering body 13 demonstrates steering legs 44 and 46, wherein the securing element 32 mechanically connects the first steering leg 44 to the second adjusting body 28b of the second adjusting unit 20b of the adjusting device 16, whereas the second steering leg 46 is in active engagement with the retaining means 4. The first steering leg 44 and the second steering leg 46 likewise form an L-shaped element which is rotatable around a steering-leg axis 47.

FIG. 2A illustrates a top view onto the adjusting device 14. As stated, the adjusting device 14 comprises the adjusting bodies 26a, 26b and 26c. Each of these bodies 26a, 26b, 26c demonstrates a mechanical limit stop which also serves as guide element. In the embodiment illustrated in the figures, a structure of the mechanical limit stop respectively configured in each adjusting body 26a, 26b 26c is embodied as an elongated hole 48a, 48b, 48c. Moreover, each mechanical limit stop comprises a limit-stop element, which in the illustrated embodiment is embodied as tappet 50a, 50b, 50c respectively. As shown in FIG. 2B, the third adjusting unit 18c further includes another third adjusting unit 18d thus defining a plurality of third adjusting units, which can be identified as a first third adjusting unit 18c and a second third adjusting unit 18d.

To this end, a first limit-stop element in the form of the tappet 50a is configured stationary on the housing component 10 and engages a first structure of the first adjusting body 26a in the form of the elongated hole 48a. A second mechanical limit stop comprises a tappet 50c, which is configured on the third adjusting body 26c and engages a second structure of the second adjusting body 26b in the form of the elongated hole 48b. A third mechanical limit stop is embodied by the third limit-stop element in the form of the tappet 50b, which is arranged stationary to the first adjusting body 26a and engages a third structure in the form of an elongated hole 48c, which is configured in the third adjusting body 26c.

As will be explained later, the length or dimension of the elongated holes 48a, 48c, 48b determines the respective maximum travel path of the first adjusting unit 18a, the second adjusting unit 18b and the third adjusting unit 18c.

Analogously, the second adjusting device 16 or its adjusting units 20a, 20b and 20c demonstrates structures of the respective mechanical limit stops, which are in the form of elongated holes 52a, 52b, b2c embodied in the adjusting bodies 28a, 28b, 28c, as well as limit-stop elements, which are in the form of the tappets 54a, 54b, 54c configured on the housing component 10 or the respective adjusting bodies 28a, 28b, 28c.

Moreover, as evident in FIGS. 2, 3 and 5, the adjusting bodies 26a, 26b, 26c are mounted on a bearing element 56 and the adjusting bodies 28a, 28b, 28c are mounted on a bearing element 58 in such a manner they each can rotate around a common bearing axis 60 or 62 respectively. As furthermore evident from FIGS. 2, 3 and 5, the shape-memory element 22a of the first adjusting means or the first adjusting unit 18a of the adjusting device 14 is arranged between tappet 50a secured on the housing component 10 and a first pin 64a. The shape-memory element 22c of the third adjusting unit 18c on the other hand is mechanically arranged between the tappet 50b and the pin 64c configured on the third adjusting body 26c. The second shape-memory element 22b of the second adjusting unit 18b is mechanically arranged between the tappet 50c configured on the third adjusting body 26c and the pin 64b configured on the second adjusting body 26c.

In an analogous manner, the shape-memory element 24a is mechanically arranged between the tappet 54a and the pin 66a, the shape-memory element 24c between the tappet 54c and the pin 66c, and the shape-memory element 24b between the tappet 54c and the pin 66b.

The adjusting means of the adjusting units 18a, 18b, 18c or 20a, 20b, 20c in the form of shape-memory elements 22a, 22b, 22c or 24a, 24b, 24c respectively can be triggered or actuated independently of each other, especially by heating or applying current.

As already mentioned and illustrated in FIG. 6, the different lengths of the elongated holes 48a, 48b, 48c or 52a, 52b, 52c determine different maximum travel paths of the adjusting units 18a, 18b, 18c or 20a, 20b, 20c.

This kinematics will now be explained in more detail based on the first adjusting device 14 and FIG. 6, wherein this description analogously applies to the adjusting device 16.

The elongated hole 48a determines a maximum travel path of length $l_1$, for example 1 mm. This means that when current is applied to the shape-memory element 22a, the first adjusting body 26a will be rotated around the bearing element 54 by an angle that corresponds to a circular distance $l_1$. For example, applying current to the shape-memory element 22a can result in an increase in the length of the shape-memory element 22a. If the current is stopped, the shape-memory element 22a will shorten itself again and will be reset in correspondence with the circular distance $l_1$.

The elongated hole 48b configured in the second adjusting body 26b on the other hand demonstrates a length of $l_2$, for example 2 mm, which corresponds to a circular distance of $l_2$. If the second shape-memory element is actuated by applying current, this will result in a movement of the second adjusting body by a length of a maximum travel path $l_2$, which corresponds to a circular distance of $l_2$ around the axis 56.

Finally, the third elongated hole 48c is dimensioned in a manner that makes it possible for the third adjusting body to move relative to the first adjusting body by a circular distance of $l_3$, for example 4 mm. The distance $l_3$ represents the third maximum travel path.

As schematically depicted in FIG. 6, applying current to the shape-memory element 22c causes the third adjusting body 26c and consequently also the shape-memory element 22b and the second adjusting body 26b to move relative to the base body due to the interaction between the tappet 50c and the elongated hole 48b of the mechanical limit stop.

Since the shape-memory elements 22a, 22b, 22c can be energized independently of each other, it is possible to set different total travel paths $l_g$. If for example only the first shape-memory element 22a is actuated by applying current, there will occur a movement of the first adjusting body 26a relative to the housing component 10 by the circular distance $l_1$. Due to the connection of the first adjusting body 28a to the third adjusting body 26c, which in turn is connected to the second adjusting body 26b, the adjusting bodies 26c and 26b will also move by this circular distance, leading to a movement of the steering body 12, the movement corresponding to the circular distance of $l_1$. This is illustrated in (i) in FIG. 6.

If, however, current is not applied to the first shape-memory element 22a but is applied to the shape-memory element 22b, there results no movement of the first adjusting body 26a relative to the housing component 10 and also no movement of the third adjusting body 26c relative to the first adjusting body 26a or the housing component 10. There solely occurs a movement of the second adjusting body 26b relative to the third adjusting body 26c and therefore to the housing component 10. But since the travel path $l_2$ of the second adjusting unit is twice as large for example as the maximum travel path $l_1$ of the first adjusting unit 18a, the steering body 12 is deflected by an angle which corresponds to a circular distance of $l_2$. This is illustrated in (ii) in FIG. 6.

But it is possible not only to trigger the shape-memory elements individually but also to trigger a combination of the shape-memory elements. If for example, as illustrated in FIG. 6 (iii), current is applied to all three shape-memory elements 22a, 22b, 22c, there results a movement of steering body 30 corresponding to a circular distance of $l_g=l_1+l_2+l_3$, the energizing of the first shape-memory element 22a leading to a movement by a distance of $l_1$, the energizing of the second shape-memory element 22c leading to a movement around a circular travel path $l_2$, and the energizing of the third shape-memory element 22c leading to a movement around the circular travel path $l_3$, which add up because of the series connection of the adjusting units 18a, 18b, 18c or of the adjusting bodies 26a, 26b, 26c.

If the energizing of the respective shape-memory element is terminated, there results a shortening of the corresponding shape-memory element and the respective tappets 50a, 50b, 50c slide along the respective elongated hole 48a, 48b, 48c into the respective opposite deformation. Suitable shape-memory elements demonstrate a spring action which counteracts the movement from the actuation.

Although the above description described only three adjusting units for an adjusting device, the number of adjusting units can be increased as desired. To this end, the third adjusting unit is replaced by two or three adjusting units. The respective three adjusting units then preferably demonstrate maximum travel paths among each other which respectively differ from one another by the factor 2. Moreover, the respective adjusting means of the third adjusting units are then arranged between the first adjusting unit on one side and the second adjusting unit on the other side, wherein the third adjusting units are once more connected among each other in mechanical series.

Finally, FIGS. 7 to 9 illustrate a second embodiment of an actuator device 2' according to the invention. The actuator device 2' essentially demonstrates a construction comparable to the actuator device 2, so that elements of the actuator device 2' that correspond to those of actuator device 2 have the same reference characters, although simply with primes.

In contrast to the actuator device 2 however, the adjusting devices 14' and 16' or their adjusting units 18a', 18b' 18c' each comprise two adjusting means in the form of shape-memory elements. To this end, the individual shape-memory elements are connected to each other in such a manner that one shape-memory element effects a movement of the adjusting unit in a first direction and the other shape-memory element effects a movement of the adjusting unit in the thereto opposite direction. Thus FIGS. 7 to 9 illustrate that besides the shape-memory element 22a', the first adjusting unit comprises the additional adjusting means in the form of shape-memory element 72a'. The shape-memory element 72a' is mechanically arranged between a pin 74a', which is arranged stationary to the housing component 10, and a pin 76a', which is arranged stationary to the first adjusting body. If the shape-memory element 22a' is actuated and thus shortened out of the position illustrated in FIG. 7, the first adjusting body 26a' will rotate around the axis 56' and the tappet 50a' will travel along the elongated hole 48a'. An expansion of the shape-memory element 72a' will take place at the same time. If a movement of the adjusting body 26a' in the opposite direction is subsequently desired, there will occur an actuation of the shape-memory element 72a', which will thereupon again shorten its length, thereby simultaneously increasing the length of shape-memory element 22a' and again moving the tappet 50a' along the elongated hole 48a' until the position illustrated in FIG. 7 is again attained. In an analogous manner, another shape-memory element 72b' of the second adjusting unit 18b' is arranged between a pin 74c' configured on the third adjusting body 26c' and a pin 76b' configured on the second adjusting body 26b'. The shape-memory element 72b' effects a movement which counteracts the movement of the shape-memory element 22b'. Finally, another shape-memory element 72c', which counteracts the movement of the shape-memory element 22c', is arranged between a pin 74b' configured on the first adjusting body 26a' and the pin 76c' configured on the third adjusting body 26c'.

A construction as in the actuator device 2, in which a shape-memory element makes it possible to move from a first position into a second position by actuating the shape-memory element and a reverse movement by ending the actuation, the necessity that a locking into the position should be provided.

If however two shape-memory elements, which are parallel but acting in opposite directions, are used, it is possible to dispense with this type of locking since "one-way" shape-memory elements each provide for stabile states. If shape-memory elements with a flat spring constant are used, the spring-memory element can retain its adjusted position after cooling off, but the "counter-shape-memory element" can restore it back to an original position before its energization without high expenditure of power.

In the embodiment illustrated in FIGS. 7 to 9, the adjusting bodies 26a', 26b' 26c' and 28a', 28b' 28c' are thus slightly modified in comparison to the actuator device 2. Thus the adjusting bodies demonstrate the extra pins 74a', 74b' 74c' and 76a', 76b', 76c'. Furthermore, the second adjusting unit 18c comprises the shape-memory elements 22b' and 72b' for example.

The features of the invention indicated in the above description, the claims and the drawing can be essential to the realization of the invention and its various embodiments both individually and in any desired combination.

| List of Reference Characters | |
|---|---|
| 2, 2' | actuator device |
| 4, 4' | retaining means |
| 6, 6' | bearing unit |
| 8 | cross strut |
| 10, 10' | housing component |
| 12, 12' | steering body |
| 13, 13' | steering body |
| 14, 14' | adjusting device |
| 16, 16' | adjusting device |
| 18a, 18b, 18c, 18a', 18b', 18c' | adjusting body |
| 20a, 20b, 20 | adjusting unit |
| 22a, 22b, 22c, 22a', 22b', 22c' | shape-memory element |
| 24a, 24b, 24c, 24a', 24b', 24c' | shape-memory element |
| 26a, 26b, 26c, 26a', 26b', 26c' | adjusting body |
| 28a, 28b, 28c, 28a', 28b', 28c' | adjusting body |
| 30, 30' | securing element |
| 30, 32' | securing element |
| 38 | steering legs |
| 40, 40' | steering leg |
| 42, 42' | steering-leg axis |
| 44 | steering leg |
| 46 | steering leg |
| 47 | steering-leg axis |

-continued

| List of Reference Characters | |
|---|---|
| 48, 48b, 48c, 48a', 48b', 48c' | elongated hole |
| 50a, 50b, 50c, 50a', 50b', 50c' | tappet |
| 52a, 52b, 52c | elongated hole |
| 54a, 54b, 54c | tappet |
| 56, 56' | bearing element |
| 58, 58' | bearing element |
| 60, 60' | bearing axis |
| 62, 62' | bearing axis |
| 64a, 64b, 64c, 64a', 64b', 64c' | pin |
| 66a, 66b, 66c | pin |
| 72a', 72b', 72c' | shape-memory element |
| 74a', 74b', 74c' | pin |
| 76a', 76b', 76c' | pin |
| $A_1, A_2$ | axis |
| $l_1, l_2, l_3$ | travel path |
| $l_g$ | total travel path |

The invention claimed is:

1. An actuator device for a rearview device, comprising at least one retaining means on which a rearview means is secured and which is mounted in a movable manner relative to a housing component of the rearview device, at least one adjusting device having at least one first adjusting unit with at least one first adjusting means and at least one second adjusting unit with at least one second adjusting means for moving the retaining means relative to the housing component, wherein the first adjusting means and the second adjusting means each comprise at least one shape-memory element and the first adjusting unit and the second adjusting unit are arranged between the housing component and the retaining means so as to be mechanically connected in series, wherein the first adjusting unit has a first maximum travel path and the second adjusting unit has a second maximum travel path which is different from the first maximum travel path, further comprising at least one first adjusting body by means of which the first adjusting unit and the second adjusting unit are at least indirectly mechanically connected to one another, at least one second adjusting body in mechanical connection with the at least one retaining means, and wherein at least one first mechanical limit-stop limits mobility of the first adjusting body relative to the housing component, wherein the first mechanical limit-stop comprises at least one first limit-stop element, which is arranged stationary to the housing component and interacts with at least one complementary first structure of the first adjusting body, wherein the first limit-stop element comprises at least one tappet and the first structure comprises at least one elongated hole; and at least one second mechanical limit-stop carried by the first adjusting body that limits mobility of the second adjusting body and/or a steering body relative to the first adjusting body.

2. The actuator device according to claim 1, wherein the steering body is at least one steering body having a first end and a second end, the first end configured to be mechanically connected to the retaining means and the second end configured to be mechanically connected to at least one of the second adjusting unit or the second adjusting means to transmit at least one adjusting movement of at least one of the first adjusting unit, the first adjusting means, the second adjusting unit, or the second adjusting means to the retaining means.

3. The actuator device according to claim 1, wherein the first adjusting body mechanically connects the first adjusting means and the second adjusting means to one another at least indirectly and/or wherein the first adjusting means is mechanically arranged between the housing component and the first adjusting body.

4. The actuator device according to claim 1, wherein the second adjusting means is mechanically arranged between the first adjusting body and the second adjusting body.

5. The actuator device according to claim 1, wherein the adjusting device comprises at least one third adjusting unit having at least one third adjusting means comprising at least one shape-memory element, wherein the third adjusting unit is configured to be mechanically arranged between the first adjusting unit and the second adjusting unit.

6. The actuator device according to claim 5, wherein a plurality of third adjusting units is present and at least one first third adjusting unit is mechanically arranged between the first adjusting unit and at least one second third adjusting unit, wherein the second third adjusting unit is also mechanically arranged between the first third adjusting unit and the second adjusting unit.

7. The actuator device according to claim 5, wherein the third adjusting unit demonstrates a third maximum travel path different from the first maximum travel path and the second maximum travel path, and/or the third adjusting unit is a first third adjusting unit and the adjusting device further comprises a second third adjusting unit, wherein a first third maximum travel path of the first third adjusting unit is different than a second third maximum travel path of the second third adjusting unit.

8. The actuator device according to claim 5, wherein
at least one third adjusting body, which mechanically connects at least one of the third adjusting unit and the second adjusting unit, or the third adjusting means and the second adjusting means to each other, and wherein the first adjusting body connects the first adjusting unit and the third adjusting unit to one another, and/or a plurality of third adjusting bodies are present, wherein at least one of the third adjusting bodies mechanically connects at least two third adjusting units to one another.

9. The actuator device according to claim 1, wherein at least one third mechanical limit-stop limits mobility of a third adjusting body relative to the first adjusting body and/or mobility of a first third adjusting body relative to at least one second third adjusting body, and
wherein at least one of:
the first mechanical limit-stop delimits the first maximum travel path,
the second mechanical limit-stop delimits the second maximum travel path or
the at least one third mechanical limit-stop delimits a third maximum travel path,
at least one first third mechanical limit-stop delimits a first third maximum travel path, or
a second third mechanical limit-stop delimits a second third maximum travel path.

10. The actuator device according to claim 1, wherein a third adjusting unit demonstrates a third maximum travel path different from the first maximum travel path and the second maximum travel path and wherein the maximum first, second and/or third travel paths differ such that either at least two maximum travel paths differ by a factor of two, or all maximum travel paths differ from one another so that one maximum travel path is twice as large as another maximum travel path.

11. The actuator device according to claim 1, wherein at least one of:
the second mechanical limit-stop comprises at least one second limit-stop element, which is arranged stationary to at least one of the first adjusting body or a third adjusting body and interacts with at least one complementary second structure of the second adjusting body and/or of the steering body;
a third mechanical limit-stop comprises at least one third limit-stop element, which is arranged stationary to the first adjusting body and interacts with at least one complementary third structure of the third adjusting body;
a first third mechanical limit-stop comprises at least one first third limit-stop element, which is arranged stationary to the first adjusting body and interacts with at least one complementary first third structure of the first third adjusting body; or
a second third mechanical limit-stop comprises at least one second third limit-stop element, which is arranged stationary to the first third adjusting body and interacts with at least one complementary second third structure of the second third adjusting body.

12. The actuator device according to claim 11, wherein
at least one of the first limit-stop element, the second limit-stop element, the third limit-stop element, the first third limit-stop element or the second third limit-stop element comprises at least one riser, at least one pin, or at least one tappet, and;
at least one of the first structure, the second structure, the third structure, the first third structure or the second third structure comprises at least one surface, at least one opening, at least one elongated hole, or at least one groove; or
at least one of the first limit-stop element, the second limit-stop element, the third limit-stop element, the first third limit-stop element or the third limit-stop element comprises at least one surface, at least one opening, at least one elongated hole or at least one groove, and
at least one of the first structure, the second structure, the third structure, the first third structure or the second third structure comprises at least one riser, at least one pin, or at least one tappet.

13. The actuator device according to claim 11, wherein
at least one of the first limit-stop element, the second limit-stop element, the third limit-stop element, the first third limit-stop element, the second third limit-stop element, the first structure, the second structure, the third structure, the first third structure or the second third structure is configured as a guide element for guiding the movement of at least one of the first adjusting unit, the second adjusting unit, the third adjusting unit, the first adjusting body, the second adjusting body, the third adjusting body or the steering body.

14. The actuator device according to claim 11, wherein
at least one of the first adjusting body, the second adjusting body, the third adjusting body, the first third adjusting body or the second third adjusting body is generally planar, and/or at least two adjusting bodies are rotatably mounted around a common bearing axis, which is secured by at least one bearing element.

15. The actuator device according to claim 1, wherein the actuator device can be used to move a rearview device of a motor vehicle.

16. The actuator device according to claim 1, wherein the retaining means is configured as a generally planar structure or frame structure, the rearview means comprises at least one of a mirror, a camera or at least one display device, the rearview means configured to be at least one of a stationary position or moved in a translatable, rotatable and/or slewable manner relative to the housing component, or moved from at least one first position into at least one second position relative to the housing component by means of the actuator device.

17. The actuator device according to claim 1, wherein the first adjusting unit comprises at least two first adjusting means, the second adjusting unit comprises at least two second adjusting means and/or a third adjusting unit comprises at least two third adjusting means, and
   wherein the two first adjusting means are configured to change a first travel path into different directions, the two second adjusting means are configured to change a second travel path into different directions, and/or the two third adjusting means are configured to change a third travel path into different directions.

18. The actuator device according to claim 1, wherein when heated or energized, the at least one shape-memory element changes its extent into at least one principal direction of extension or into a direction of extension running parallel to the travel path of the respective adjusting unit, and wherein a degree of change of the shape-memory element extent is proportional to a current intensity of an applied current and/or a temperature applied to the shape-memory element.

19. The actuator device according to claim 1, wherein a working direction of at least one of the first adjusting unit, the second adjusting unit, a third adjusting unit, the first adjusting means, the second adjusting means or a third adjusting means runs generally parallel, generally perpendicularly, or generally diagonally to at least one principal plane of the retaining means and/or rearview means.

20. The actuator device according to claim 1, wherein at least two adjusting means comprises one of the first adjusting means and the second adjusting means, one of a plurality of first adjusting means and one of a plurality of second adjusting means, the plurality of first adjusting means, or the plurality of second adjusting means and the at least two adjusting means are configured to be triggered either in common or independently of one another by application of current and/or heat.

21. The actuator device according to claim 1, wherein at least one bearing unit has a first end and a second end, wherein the first end of the at least one bearing unit is configured to be secured on the housing component, and the retaining means is configured to be mounted on the second end of the bearing unit opposite the first end such that the retaining means can be moved by the actuator device.

22. The actuator device according to claim 1, including at least a first adjusting device and a second adjusting device, wherein the first adjusting device is configured to rotate and/or swivel the retaining means around at least one first axis and the second adjusting device is configured to rotate and/or swivel the retaining means around at least one second axis running orthogonal to the first axis, the first adjusting device is configured to simultaneously rotate and/or swivel the retaining means around the at least one first axis and the at least one second axis, and the second adjusting device is configured to simultaneously rotate and/or swivel the retaining means around the at least one first axis and the at least one second axis, wherein a first movement of the first adjusting device in a same direction and/or a mirror-image direction relative to a second movement of the second adjusting device leads to rotation and/or swiveling of the retaining means around the first axis and/or the second axis in a direction opposite of the second movement.

23. The actuator device according to claim 1, wherein the steering body comprises two steering legs configured as a first steering leg and a second steering leg and arranged in an L-shape to one another, and wherein a securing element of the adjusting device and/or an adjusting body of the adjusting device is configured to be secured on at least the first steering leg and the second steering leg is configured to be secured on the retaining means, and/or the first steering leg and the second steering leg are configured to be rotatably arranged on a common steering-leg axis.

24. The actuator device according to claim 1, wherein the steering body comprises a plastic, a ceramic and/or a metal.

25. A rearview device for a motor vehicle comprising the housing component and the retaining means for the rearview means, wherein at least one actuator device is configured to rotate and/or swivel the retaining means relative to the housing component in at least one spatial direction, and wherein the at least one actuator device according to claim 1 is used as the actuator device.

* * * * *

UNITED STATES PATENT AND TRADEMARK OFFICE
CERTIFICATE OF CORRECTION

PATENT NO. : 10,744,946 B2
APPLICATION NO. : 15/104113
DATED : August 18, 2020
INVENTOR(S) : Romeo Wieczorek It is certified that error appears in the above-identified patent and that said Letters Patent is hereby corrected as shown below:

In the Claims

Column 18, Claim 12, Line 42, after "limit-stop element or the" insert --second--

Signed and Sealed this
Twenty-ninth Day of September, 2020

Andrei Iancu
*Director of the United States Patent and Trademark Office*